United States Patent [19]
Dent

[11] Patent Number: 6,061,568
[45] Date of Patent: May 9, 2000

[54] METHOD AND APPARATUS FOR MITIGATING INTERMODULATION EFFECTS IN MULTIPLE-SIGNAL TRANSMISSION SYSTEMS

[75] Inventor: Paul W. Dent, Pittsboro, N.C.

[73] Assignee: Ericsson Inc., Research Triangle Park, N.C.

[21] Appl. No.: 08/724,469

[22] Filed: Oct. 1, 1996

[51] Int. Cl.$^7$ ...................................................... H04Q 7/20
[52] U.S. Cl. ................................ 455/450; 455/62; 455/63
[58] Field of Search .............................. 455/234.1, 450, 455/127, 232.1, 453, 63, 69, 70, 522, 62, 102, 103; 375/296

[56] References Cited

U.S. PATENT DOCUMENTS

| | | | |
|---|---|---|---|
| 3,917,998 | 11/1975 | Welti | 455/13.1 |
| 4,038,600 | 7/1977 | Thomas | 455/13.4 |
| 4,455,681 | 6/1984 | Wile | 455/243.1 |
| 5,163,181 | 11/1992 | Koontz | 455/103 |
| 5,295,138 | 3/1994 | Greenberg et al. | 455/63 |
| 5,430,760 | 7/1995 | Dent | 455/63 |
| 5,475,870 | 12/1995 | Weaver, Jr. et al. | 455/67.1 |
| 5,491,837 | 2/1996 | Haartsen | 455/62 |
| 5,574,967 | 11/1996 | Dent et al. | 455/12.1 |
| 5,574,974 | 11/1996 | Almgren et al. | 455/450 |
| 5,584,057 | 12/1996 | Dent | 455/101 |
| 5,603,081 | 2/1997 | Raith et al. | 455/33.1 |
| 5,619,503 | 4/1997 | Dent | 455/450 |
| 5,697,081 | 12/1997 | Lyall, Jr. et al. | 455/249.1 |

FOREIGN PATENT DOCUMENTS

| | | |
|---|---|---|
| 308 253 | 3/1989 | European Pat. Off. |
| 411 878 | 2/1991 | European Pat. Off. |
| 522 276 | 1/1993 | European Pat. Off. |

OTHER PUBLICATIONS

Donald J. Wheeler et al., "The Power–Ordered Intermodulation Algorithm," *Bridging the Gap Between Interoperability, Survivability, Security*, 1989 IEEE Military Communications Conference, Oct.15–18, 1989, vol. 1, pp. 100–105.

Wallace C. Babcock, "Intermodulation Interference in Radio Systems/Frequency of Occurrence and Control by Channel Selection," *Bell System Technical Journal*, vol. 31, 1953, pp. 63–73.

*Primary Examiner*—Reinhard J. Eisenzopf
*Assistant Examiner*—Sam Bhattacharya
*Attorney, Agent, or Firm*—Burns, Doane, Swecker & Mathis, L.L.P.

[57] ABSTRACT

Method and apparatus for mitigating intermodulation distortion effects in frequency division multiple access (FDMA) communications systems. In one embodiment, an effective transmit power level is determined for each communication signal to be transmitted, and signals are allocated to frequency channels such that a smooth tapering of transmit power levels across contiguous frequency channels is achieved. Such smooth power tapering across frequency channels minimizes the possibility that two high power signals will generate an intermodulation distortion product sufficient to disrupt transmission of an immediately adjacent low power signal. In another exemplary embodiment, communication signals are allocated such that high power signals are positioned near a frequency band center, while low power signals are positioned near frequency band edges. As a result, intermodulation distortion between frequency bands in a multiple-band communication system is also minimized.

22 Claims, 7 Drawing Sheets

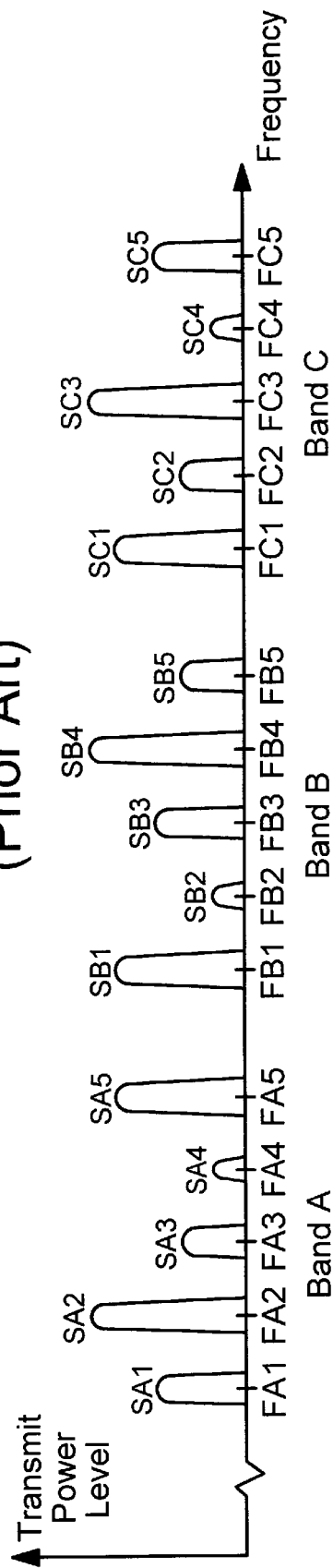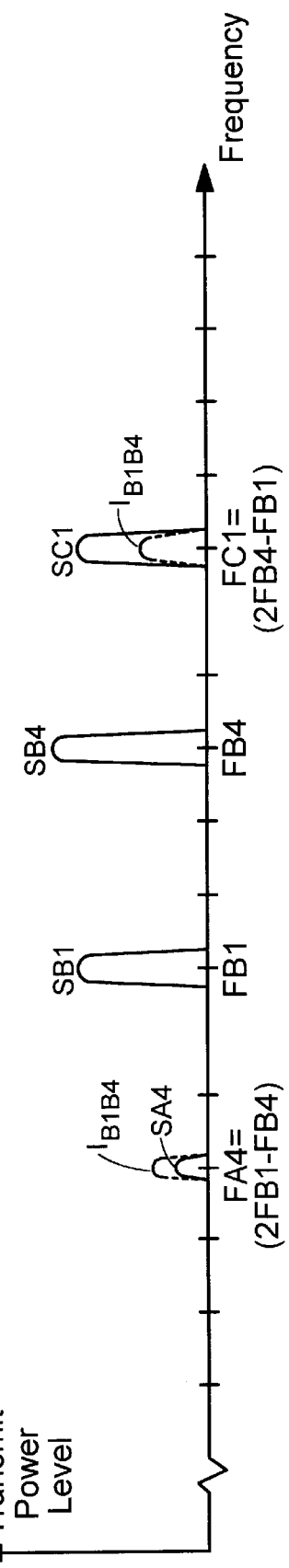

METHOD AND APPARATUS FOR MITIGATING INTERMODULATION EFFECTS IN MULTIPLE-SIGNAL TRANSMISSION SYSTEMS

BACKGROUND

The present invention relates to electronic communication systems, and more particularly to systems in which multiple signals are simultaneously transmitted at varying power levels.

In most electronic communication systems, it is often necessary that groups of information signals be amplified and transmitted simultaneously. For example, a cellular radio base station transmitter typically transmits signals to many active receiving mobile stations within a single geographic cell. Similarly, a satellite communications transponder amplifies and transmits large numbers of information signals destined for various participating remote stations. Because such systems customarily employ a frequency division multiple access (FDMA) scheme, in which information signals are modulated on signal carriers occupying contiguous frequency channels within an allocated frequency band, care must be taken to avoid inter-channel interference which may corrupt signal transmissions.

One possible source of such cross-channel interference is known as intermodulation distortion, which may result when two or more signals of different frequencies are mixed. For example, if two carriers of different frequencies are amplified using a non-linear amplifier, spurious outputs occur at the sum and difference of integer multiples of the original carrier frequencies. As described in detail below, third order intermodulation distortion products can present significant problems in FDMA systems. For example, a third order intermodulation product resulting from two relatively strong signals may disrupt transmission of a third relatively weak signal being transmitted on a carrier having a frequency equal to the frequency of the intermodulation product.

In power amplifiers, a trade-off is made between DC to RF power conversion efficiency and the level of intermodulation products generated by the amplifier. Thus, good DC to RF power conversion efficiency and high spectral purity can be contradictory requirements. The choice of amplifier is therefore significant in the design of the cellular base station architecture.

To date, there have been several base station architectures identified. Most commonly, base stations use a single carrier power amplifier (SCPA) with a frequency selective combiner. This architecture offers about 6–7% overall DC to RF power conversion efficiency due to the insertion losses encountered in the accompanying frequency combiner. The frequency combiner is also large and has "static" frequency selectivity which may need to be manually tuned during the base station installation.

Another common choice of architecture employs a multi-carrier power amplifier (MCPA). MCPAs are generally constructed to be highly linear in order to avoid generating intermodulation products which arise as a result of mixing the different modulated carrier frequencies within the amplifier. Therefore, even though no frequency combiner is required, this solution only offers an overall DC to RF power conversion efficiency of about 4–6%. Although comparable to the above mentioned SCPA/frequency combiner solution, the MCPA typically has much lower robustness and reliability. A high power MCPA is also a complex technology, i.e., not easy to master in production.

The intermodulation introduced by MCPAs has conventionally been reduced by using one of two methods: feed-forward cancellation amplification, or linear amplification with non-linear components (LINC). LINC amplification is quite complex and is currently completely unsuitable for low-cost, mass produced amplifiers.

A block diagram of a conventional feed-forward cancellation amplifier is illustrated in FIG. 1. In FIG. 1, an RF input signal is applied to coupler 100$a$ which couples portions of the input signal to delay line 140 and to main amplifier 110. Main amplifier 110 produces an amplified output having intermodulation products generated due to non-linearities in main amplifier 110. A portion of the amplified output signal is coupled to summer 150 by coupler 100$b$. Delay line 140 delays the coupled portion of the input signal with respect to the output of main amplifier 110 producing a delayed signal such that the two signals reach summer 150 at approximately the same time. The output of summer 150 is an error signal which is coupled to auxiliary amplifier 160. Auxiliary amplifier 160 adjusts the amplitude of the error signal producing an error correction signal. The error correction signal should be matched in amplitude to the intermodulation products generated by main amplifier 110, but reversed in phase. The resultant vector cancellation of the intermodulation products is performed in coupler 100$c$ where the error correction signal is subtracted from the amplified input signal. For the output signal to have intermodulation products which are greater than −60 dB down from the carrier frequencies, the vector cancellation must be performed with a high degree of accuracy. Typically this requires that the error correction signal be maintained with greater than 0.5 degrees phase accuracy and 0.1 dB amplitude accuracy which is difficult to achieve in production. The feed-forward technique can be used in an MCPA to effectively suppress intermodulation products but at the cost of low power efficiency and a high demand on complexity and component cost. In particular, high power MCPAs are difficult to master in production.

Accordingly, it would desirable to provide other techniques which reduce intermodulation distortion to, for example, compensate for non-linearities introduced by power amplifiers in multi-carrier environments.

SUMMARY

The present invention fulfills the above-described and other needs by providing a method and apparatus for mitigating intermodulation effects in a communication system in which a plurality of communication signals of varying strength are modulated on a plurality of frequency channels and then amplified for transmission. According to one exemplary embodiment, an effective transmit power level is first determined for each communication signal to be transmitted. For example, power levels used in a cellular radio base station to transmit signals to remote units may be adjusted in accordance with the distances between the base station and the remote units. Once an effective transmit power level has been determined for each communication signal, the signals are allocated to frequency channels such that a smooth tapering of transmit power levels across contiguous frequency channels is achieved.

In other words, signals are positioned within the spectrum such that high power signals are not located immediately adjacent low power signals. Rather, there exists an ordered transition from high power signals to low power signals with intermediate power signals in between. By maintaining such a power tapering across frequency channels, the possibility that two high power signals will generate intermodulation distortion that interferes with an immediately adjacent low power signal is minimized.

In one exemplary embodiment, communication signals are allocated such that high power signals are positioned near the center of a given frequency band, while low power signals are positioned near frequency band edges. In this way, intermodulation distortion between frequency bands in a multiple-band system is also minimized.

The present invention provides a cost effective technique for minimizing intermodulation distortion in a multiple carrier communication system in which signals are transmitted at varying power levels. Further features of the invention are explained hereinafter with reference to illustrative examples shown in the accompanying drawings.

BRIEF DESCRIPTION OF THE DRAWINGS

The foregoing, and other, features, objects and advantages of the present invention will become more apparent to those skilled in the art upon reading the following detailed description, when read in conjunction with the drawings, in which:

FIG. 7A depicts a conventional frequency channel allocation scheme in which signals in a multiple-band system are assigned to channels without regard to transmit power level;

FIG. 7B depicts intermodulation distortion products which result from simultaneous non-linear amplification of multiple carrier signals in a multiple-band system;

DETAILED DESCRIPTION

Figure 2:
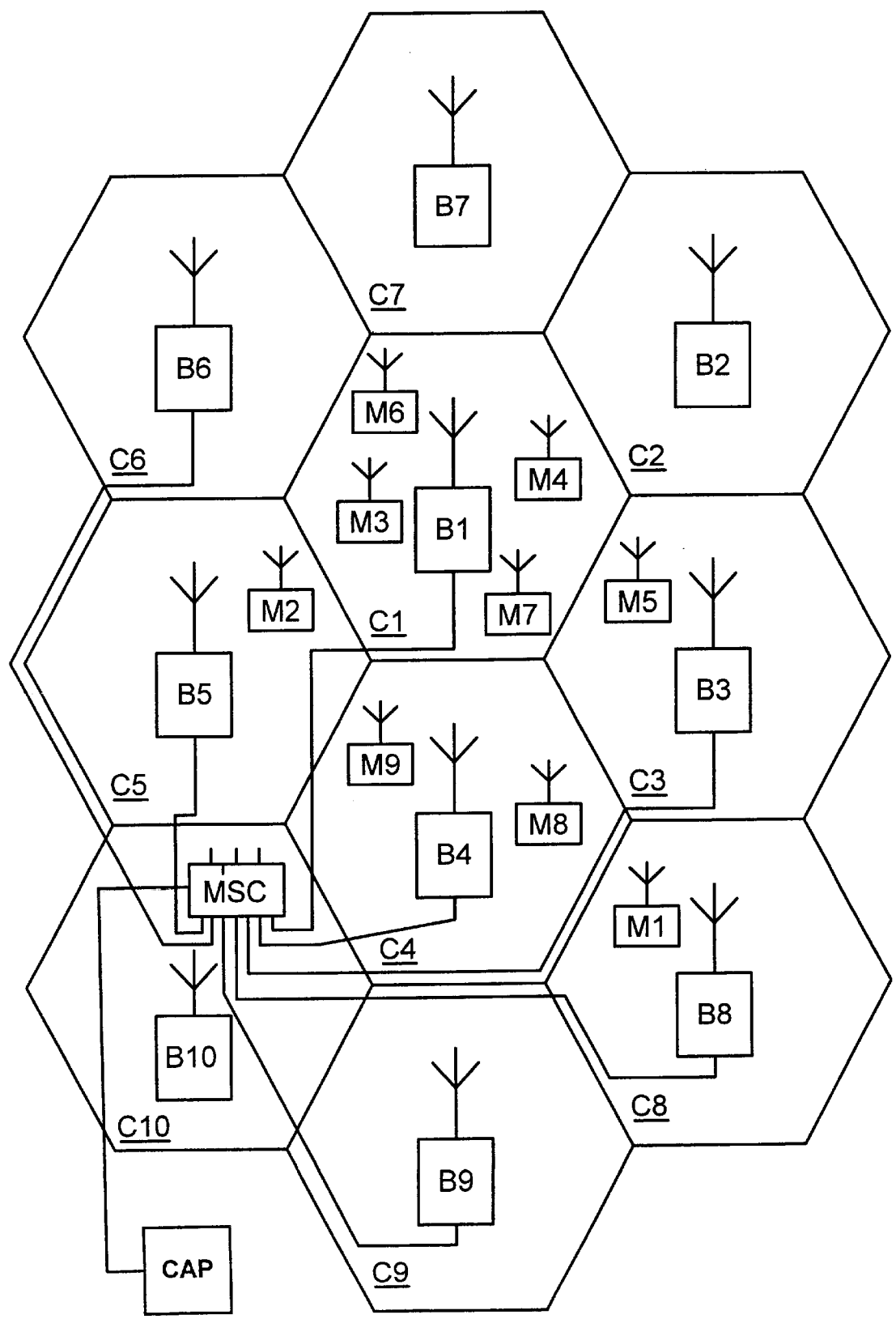
FIG. 2 depicts cellular mobile communication system according to the invention including multiple cells, a mobile switching center, multiple base stations, multiple mobile stations and a channel allocation processor.

FIG. 2 depicts ten cells C1–C10 in a cellular mobile radio communication system in which the teachings of the present invention can be implemented. As shown, there is a base station B1–B10 associated with each cell C1–C10. Additionally, there are nine mobile stations M1–M9 which are movable within a cell and from one cell to another. In practice, a cellular mobile radio system would be implemented using more than ten cells and would include far more than nine mobile stations. However, the simplified representation of FIG. 2 is sufficient for purposes of explaining the teachings of the present invention.

Also shown in FIG. 2 is a mobile switching center MSC connected to the ten base stations B1–B10 by cabling or fixed radio links. Note that not all cabling from the mobile switching center MSC to the base stations B1–B10 is shown. The mobile switching center MSC is also connected by cabling or fixed radio link (not shown) to a fixed switching telephone network or other similar fixed network and a channel allocation processor CAP. The mobile switching center MSC, the base stations B1–B10, and the mobile stations M1–M9 are all computer controlled.

In some systems, a base station transmits information signals to all mobile stations within its cell using a single broadcast antenna. In a customary FDMA system, each signal is modulated on an appropriate carrier signal prior to transmission. Carrier signal frequencies are equally spaced within a frequency band allocated for use by the cellular system. As described above, the plurality of modulated signals may be amplified using separate single-carrier amplifiers or using a single multiple-carrier amplifier.

If the effective output transmit power level associated with each signal is adjusted in accordance with the distance between the base station and the corresponding mobile station, interference between signals can be reduced and power savings can be achieved. For example, assuming a uniform geographic distribution of remote stations and a fourth power of distance propagation attenuation law, the total base station transmit power can be reduced to one third its nominal value.

Figure 3:
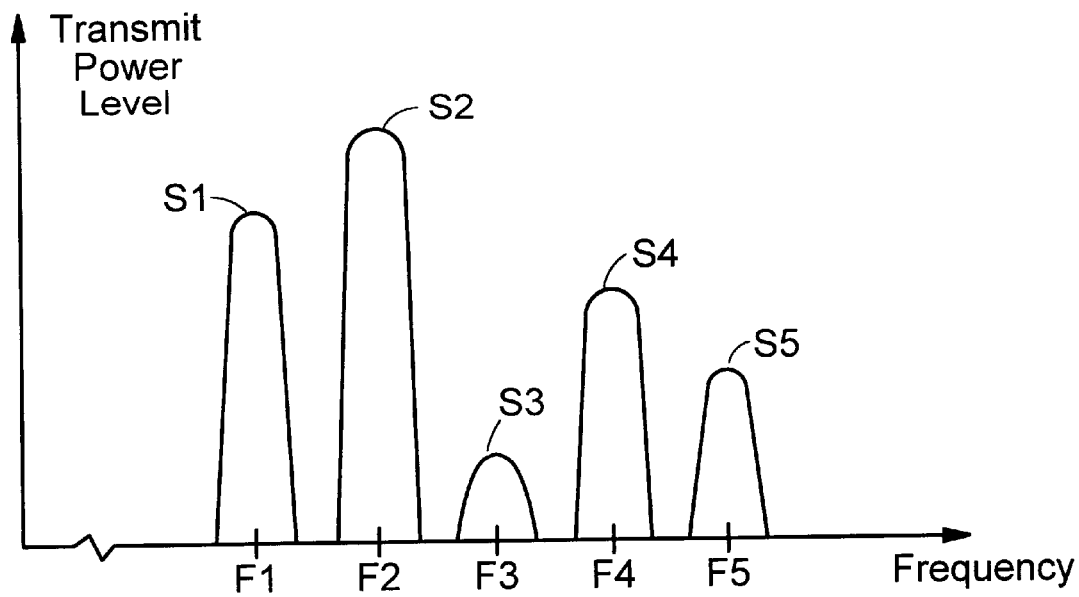
FIG. 3 depicts a conventional frequency channel allocation scheme in which signals transmitted at varying power levels are assigned to frequency channels without regard to signal power level.

In conventional systems, mobile stations are assigned to a carrier, or channel, on a first come first serve basis. In other words, when a remote station requests service, communications between that mobile station and the base station are assigned to the first available channel, possibly selected from an ordered list intended to reduce system-wide co-channel interference. FIG. 3 depicts an exemplary allocation pattern that might result from such an allocation scheme. In the figure, five signals S1–S5 are shown to be modulated on five carrier frequencies F1–F5. The carrier frequencies F1–F5 represent channels within a frequency band designated for use by a particular base station, and the signals S1–S5 represent communications from that base station to five remote stations located within the corresponding geographic cell.

As shown in the figure, the signals S1–S5 have been allocated to channels F1–F5 without regard to the relative transmit power level associated with each remote station. Such transmit power levels are determined based upon, for example, the distances between the base station and the remote stations and are depicted in FIG. 2 by the respective heights of the spectral representations of the signals. Note that the strengths of the signals are distributed in an unordered manner and that a low power signal may occupy a channel immediately adjacent that of one or more high power signals (e.g., signal S3 between signals S2 and S4).

Figure 4:
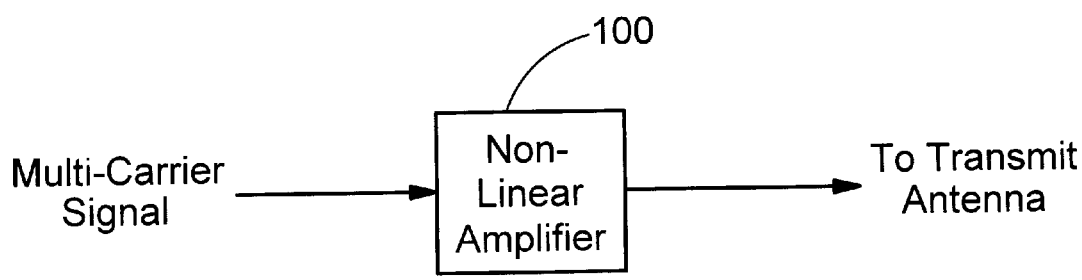
FIG. 4 is a block diagram of an amplification and transmission scheme typically used in multiple-carrier communication systems.

When used as the RF input signal to a multi-carrier amplifier, the nonlinearities associated with the amplifier create intermodulation (IM) products which can, as a worst case, render one or more of the amplified signals unintelligible. Consider the example illustrated in FIGS. 4 and 5. Assume that the signal spectrum shown in FIG. 3 is input as a multi-carrier RF signal to the non-linear power amplifier 100 of FIG. 4. The resultant signal is then coupled to the transmit antenna (not shown) for transmission over the air interface.

Figure 1:
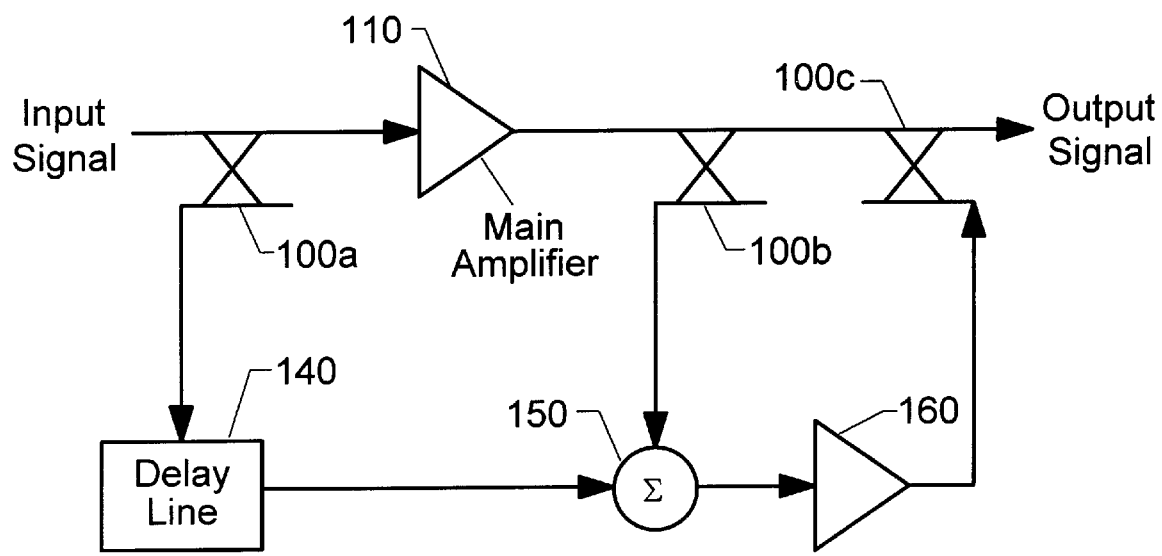
FIG. 1 illustrates a conventional feed forward circuit for compensating for intermodulation products in a multi-carrier communications application.
Figure 5:
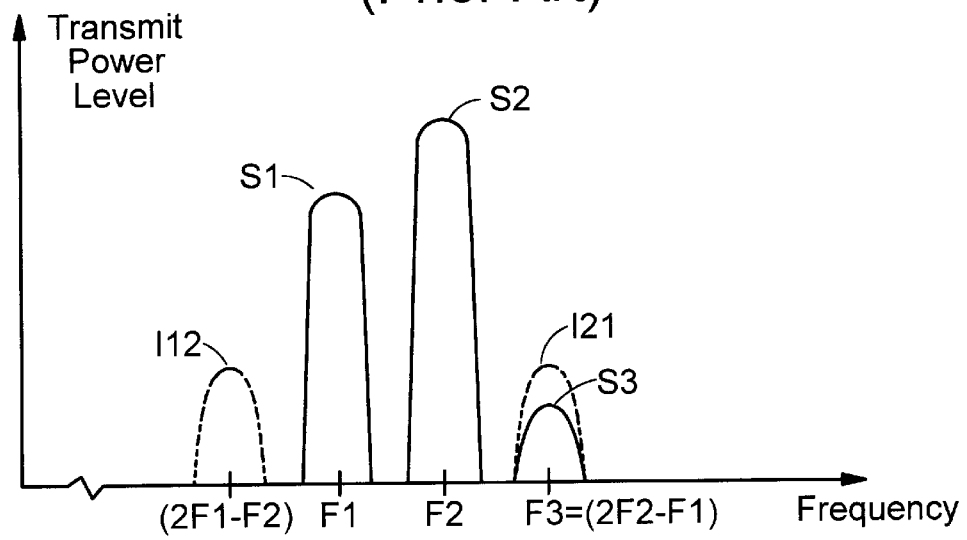
FIG. 5 depicts intermodulation distortion products which result from simultaneous non-linear amplification of multiple carrier signals.

Absent some type of corrective measures, e.g., as shown in FIG. 1, the non-linearities associated with amplifier 100 will create IM products in addition to amplifying the signals shown in FIG. 3. For example, consider the third order IM products associated with the amplification of signals S1 and S2. These IM products occur at frequencies 2F1–F2 and 2F2–F1 and are shown in FIG. 5 by way of the dotted outlines. Therein, it can be seen that one of the IM products is centered on F3, which frequency is also the center frequency of the information bearing signal S3. Since the signals S1 and S2 are themselves transmitted at such high power levels (relative to S3), their third order IM products I12 and I21 are also relatively strong. In fact, for the example shown in FIG. 5, it can be seen that the IM product I21 is stronger than signal S3, whereupon the information bearing signal S3 may be completely washed out.

Figure 6:
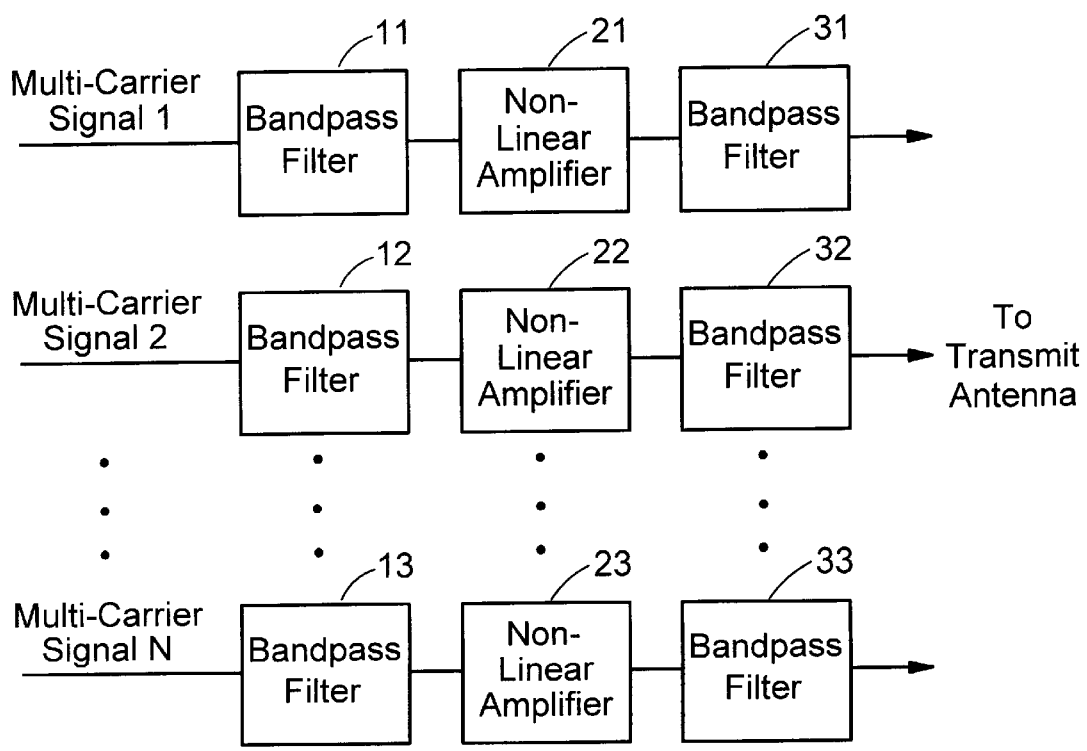
FIG. 6 is a block diagram of an amplification and transmission scheme typically used in conventional communication systems employing multiple frequency bands.

This problem is further exacerbated for base stations and communication systems wherein multiple bands and multiple non-linear amplifiers are employed. In FIG. 6, a plurality of multi-carrier signals 1–N are each input through the appropriate bandpass filters (e.g., 11, 12 and 13) to a respective non-linear amplifier (e.g., 21, 22 and 23). Optional bandpass filters (e.g., 31, 32 and 33) may also be connected to further filter the amplified output prior to coupling to the transmit antenna.

An exemplary input signal spectrum for the system of FIG. 6 is illustrated as FIG. 7A. Therein, fifteen signals (SA1–SA5, SB1–SB5 and SC1–SC5) are illustrated, five for each of three bands A, B and C. As in the previous example, within each band signals are allocated to frequency channels without regard to their respective transmit powers. Again, this leads to the creation of IM products during amplification, with the added effect of intermodulation disruption between frequency bands. This effect is illustrated in FIG. 7B.

Therein, two intermodulation products IB1B4 and IB4B1, associated with signals SB1 and SB4, are shown to impact signals SA4 and SC1. Specifically, the third order IM product, occurring at frequency 2FB1–FB4, is illustrated as having a power level which is greater than that of the transmitted signal SA4. The IM product IB4B1, on the other hand, has a power level which is significantly less than that associated with signal SC1. Note that the latter non-interfering situation occurred only by chance in the prior art, but will be systematically encouraged when practicing the present invention as described below.

As shown, IM products pose a significant problem when transmitting information using multi-carrier amplifiers having non-linear characteristics. One conventional way of handling these IM products is to use feed-forward cancellation. However, this solution is inefficient and may not be applicable to all design implementations. Thus, according to the present invention, another solution is presented.

According to an exemplary embodiment of the present invention, carrier frequencies are assigned to mobile stations based upon their needed base station transmit powers. That is, mobile stations needing higher base station transmit powers will be assigned to frequencies disposed more centrally within a group of frequencies to be amplified together, while mobile stations needing lower base station transmit powers will be assigned to frequencies disposed closer to the edges of the group. This concept is illustrated in FIGS. 8 and 9.

Figure 8:
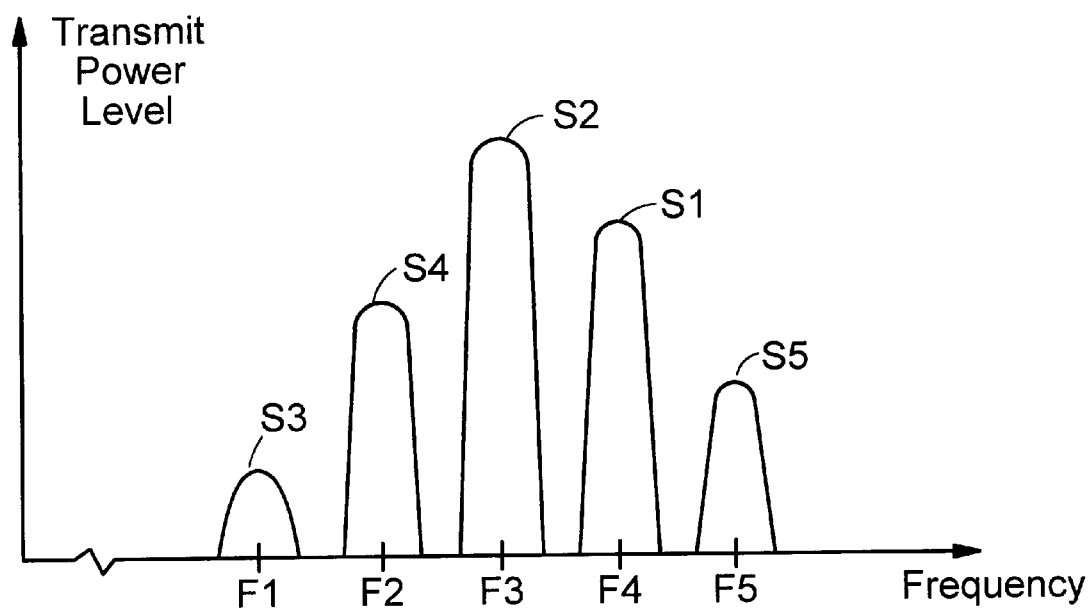
FIG. 8 depicts an exemplary frequency channel allocation scheme as taught by the present invention.
Figure 9:
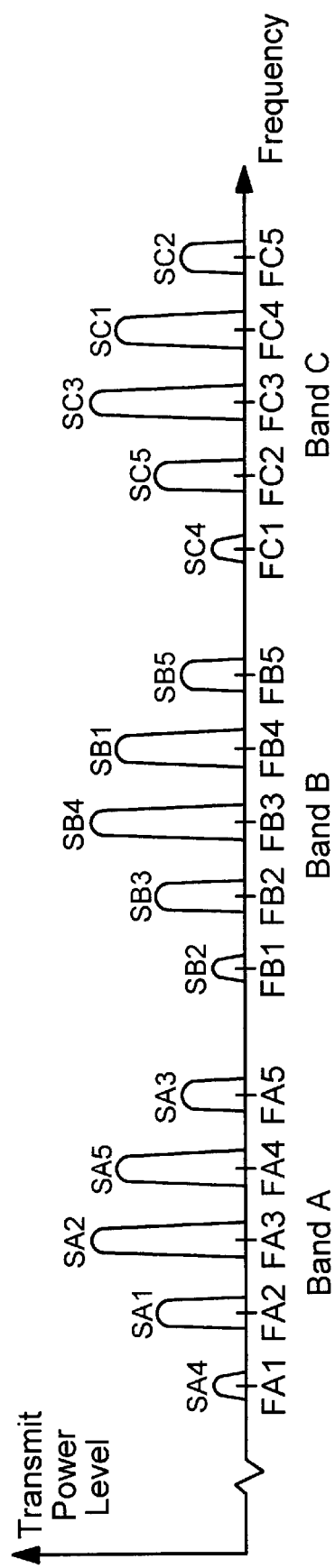
FIG. 9 depicts an exemplary multiple-band frequency channel allocation scheme as taught by the present invention.

In FIG. 8, the signal spectra discussed above with respect to FIG. 3 is reordered according to base station transmit power level. Thus, the strongest signal S2 is assigned to frequency F3 at the center of the group which is to be amplified together. The second and third strongest signals, S1 and S4, are assigned to the next most central frequencies, F4 and F2, respectively. Alternatively, S1 could be assigned to frequency F2 and signal S4 could be assigned to frequency F4 in order to optimize the distribution for the multi-band situation described below. Lastly, the weakest signals to be transmitted by the base station, S3 and S5, are assigned to the edge frequencies F1 and F5, respectively.

By ordering the transmit signals according to their transmit powers, intermodulation between the strongest signals will fall on the next strongest signals, and so on, so that the relative effect of the IM products is reduced. Moreover, since the weakest signals are placed at the edge frequencies within each band, the impact of intermodulation products between frequency bands is also reduced. Consider FIG. 9 which illustrates the signal spectra of FIG. 7A ordered according to the present invention. As with FIG. 8, within each band in FIG. 9, the strongest signals are most centrally assigned, while the weakest signals are assigned closest to the edge frequencies. In this way, intermodulation products created by one band are less likely to dominate the transmitted signals within another band.

In practice, the pattern of signals is continually changing due to calls being initiated and terminated. Terminated calls result in idle channels which are then available for serving new calls. According to the present invention, new calls are assigned to an idle channel by taking into account the power requirements of the new call as well as the power levels being used for active calls occupying channels on either side of the available idle channels.

More specifically, the power required to communicate with the new mobile station is first determined during the call setup phase, wherein signaling messages, which can include authentication of the mobile station, are exchanged. The base station is informed of the power being transmitted by the mobile station, and measures the received signal strength at the base receiver, thus establishing the path loss from mobile to base. Although no instantaneous reciprocity exists that would guarantee always equal path loss on the mobile-to-base and base-to-mobile channels, due to multipath fading being frequency-dependent, path loss reciprocity may nevertheless be assumed on average. Thus, the average base transmit power required to provide a target signal strength at the mobile receiver may be determined from the average signal strength received at the base from the mobile. The power requirement so determined is then compared with the power already in use on other channels amplified by the same base station transmit power amplifier.

The channel allocation processor performing this task e.g., the processor CAP of FIG. 2) may be located near, or may be part of, a mobile switching center. Alternatively, it may be part of a base station controller located closer to, or co-located with, the base station transmitters and receivers. The channel allocation processor may even determine the order of intermodulation between active channels that falls on the idle channels and estimate the intermodulation strength for each idle channel. It then compares the minimum required power level for the new call with the power levels already in use on channels surrounding each idle channel, and selects the idle channel having surrounding active channels of least power disparity. The selected idle channel is then assigned to the new call by sending a channel assignment message from base to mobile. The mobile then switches to the assigned channel for communicating signals.

Alternatively, the channel assignment processor can compare the minimum power level required for the new call with the estimated intermodulation levels in each of the idle channels. The processor then assigns one of the idle channels such that the ratio of intermodulation power to the desired power level meets a minimum target value. The processor may avoid allocating a channel that meets the minimum intermodulation value with a large margin, as such a channel should be reserved for new calls having a lower minimum power requirement. Of course, if available, a better channel can be advantageously allocated pending the appearance of a new call with a lower power requirement, and upon such appearance, an internal handoff may be performed which involves altering the previous frequency allocation in order to assign it to a new call. An internal handoff is performed in the same way as a handoff of a call from one base station to another, that is by sending a handoff control message to the mobile station using either a slow or a fast associated control channel.

The channel allocation processor, in a preferred implementation, would recompute intermodulation estimates for tentative internal handoffs, and pick the best channel reshuffling to accommodate both the new call and the ongoing calls with acceptable intermodulation levels. According to one aspect of the invention mentioned above, a simple algorithm for such reshuffling or signal ordering comprises merely sorting calls by base station transmitter power requirement and then ordering the channels within the radio spectrum such that those having the greatest power requirements are in the center of the spectral band amplified by the same power amplifier while those having progressively lower power requirements are allocated channels progressively nearer the edges of the amplified band, as is depicted in FIG. 8.

It will be appreciated by those familiar with cellular technology that base stations often collect together on the same site the transmitters and receivers for three cells, in order to reduce real estate costs for base station sites. A common site located at the common boundary between three neighboring cells serves the three cells by using 120-degree directional antennas directed towards the center of each of the three surrounding cells. The cells are then known as "sectors", although a "sector" is merely a cell that is illuminated from a station at the edge rather than the center. The antenna for a given sector is connected to at least one transmitter for that sector and at least one receiver for the sector. Thus, three antennas and associated transmitters are often erected at the same site to serve three sectors or cells. The frequencies used in neighboring cells are usually, in FDMA and TDMA systems at least, chosen deliberately to be different according to a frequency re-use plan, such as a 21-cellre-use plan in which 21 groups of frequencies are given to the 3×7 sectors served by 7, three-sector base station sites. Each group of frequencies may be clustered together into a sub-band, and FIG. 8 illustrates three sub-bands used in respective sectors at the same site, that is in adjacent cells. Within each sub-band, the channels are allocated according to power so as to achieve the desired spectral tapering across each sub-band, thus reducing intermodulation effects between channels in the same sub-band, as well as reducing intermodulation between sub-bands.

It will be appreciated that the present invention is not limited to the specific embodiments which have been described herein in order to facilitate an understanding of its underlying principles. For example, although the present invention has been described in detail with reference to a cellular radio communication system, those skilled in the art will appreciate that the teachings of the present invention are immediately applicable to any communication system in which multiple signals are transmitted on multiple frequency carriers at varying power levels. Also, positioning high-power signals at the center of a frequency band while positioning low-power signals at the edges of the frequency band is but one embodiment of the present invention. Indeed, any ordering scheme in which signals are assigned frequency channels based on transmit power requirements in order to mitigate IM product interference within or among frequency bands, or sub-bands, is contemplated herein. The scope of the invention, therefore, is defined by the claims which are appended hereto, rather than the foregoing description, and all equivalents which are consistent with the meaning of the claims are intended to be embraced therein.

What I claim is:

1. A method for allocating frequency channels in a communications system, comprising the steps of:

establishing transmit power levels for a plurality of information signals; and assigning frequency channels for transmitting the information signals, based upon the established transmit power levels, to selectively position intermodulation products of the information signals in frequency, wherein each information signal coinciding in frequency with a positioned intermodulation product is transmitted using a transmit power level sufficient to overcome interference from the coinciding intermodulation product.

2. The method of claim 1, wherein a transmit power level established for an information signal is based on a distance between a transmitting station transmitting the information signal and a receiving station receiving the information signal.

3. The method of claim 1, wherein information signals are assigned to frequency channels to achieve a smooth tapering of transmit power levels across contiguous frequency channels.

4. The method of claim 1, wherein information signals are assigned to frequency channels such that intermodulation products resulting from signals having higher transmit power levels do not coincide in frequency with signals having lower transmit power levels.

5. The method of claim 1, wherein communication signals are assigned to frequency channels such that intermodulation products generated by signals assigned to channels within a frequency band do not substantially interfere with transmission of other signals also assigned to channels within the same frequency band.

6. The method of claim 1, wherein communication signals are assigned to frequency channels such that intermodulation products generated by signals assigned to channels within a frequency band do not substantially interfere with transmission of signals assigned to channels in other frequency bands.

7. A method for allocating frequency channels in a communications system, comprising the steps of:

establishing transmit power levels for a plurality of information signals; and assigning frequency channels for transmitting the information signals, based upon the established transmit power levels, to control and thereby mitigate intermodulation effects resulting from processing the information signals for transmission, wherein the information signals are assigned to frequency channels such that an intermodulation product resulting from transmission of two particular information signals coincides in frequency with a third information signal having a transmit power level which is similar to transmit power levels of the two particular information signals.

8. A method for allocating frequency channels in a communications system, comprising the steps of:
   establishing transmit power levels for a plurality of information signals; and
   assigning frequency channels for transmitting the information signals, based upon the established transmit power levels, to mitigate intermodulation effects which result from processing the information signals for transmission,
   wherein information signals are assigned to frequency channels such that signals having higher transmit power levels are positioned near a frequency band center and signals having lower transmit power levels are positioned near a frequency band edge.

9. A method for allocating frequency channels in a communications system, comprising the steps of:
   determining signal transmit power levels to be used in transmitting information signals from at least one transmitting station to at least one receiving station; and
   using the signal transmit power levels in assigning the information signals to available frequency channels to thereby selectively position intermodulation products of the information signals in frequency such that the intermodulation products do not substantially interfere with transmission of the information signals.

10. The method of claim 9, wherein said step of using the signal transmit power levels in assigning the information signals to available frequency channels comprises the steps of:
   determining levels of intermodulation interference existing in available frequency channels; and
   assigning a particular information signal to an available frequency channel having a level of intermodulation interference which is insufficient to substantially disrupt transmission of the particular information signal.

11. The method of claim 10, wherein the particular information signal is assigned to an available frequency channel in which a ratio between the signal transmit power level of the information signal and a level of intermodulation interference in the available channel is greater than a minimum target value.

12. The method of claim 8, wherein an information signal is not assigned to a most suitable available frequency channel so that the most suitable available frequency channel may be reserved for another information signal.

13. The method of claim 9, wherein frequency channels are re-assigned as additional information signals are incorporated into the system so that each information signal is transmitted without being substantially disrupted by intermodulation interference.

14. The method of claim 13, wherein frequency channels are continually re-assigned to maintain a smooth tapering of transmit power levels across contiguous frequency channels.

15. A method for allocating frequency channels in a communications system, comprising the steps of:
   determining signal transmit power levels to be used in transmitting information signals from at least one transmitting station to at least one receiving station; and
   using the signal transmit power levels to selectively assign the information signals to available frequency channels and to thereby selectively position intermodulation products of the information signals in frequency such that the intermodulation products do not substantially interfere with transmission of the information signals,
   wherein said step of using the signal transmit power levels to selectively assign the information signals to available frequency channels comprises the steps of:
      determining, for available frequency channels, adjacent transmit power levels used to transmit information signals in channels adjacent the available frequency channels; and
      assigning a particular information signal to an available frequency channel having adjacent transmit power levels which are most similar to the signal transmit power level determined for the particular information signal.

16. A method for allocating frequency channels in a communications system, comprising the steps of:
   determining a signal transmit power level to be used in transmitting an information signals from a transmitting station to a receiving station; and
   assigning the information signal, based on the signal transmit power level, to an available frequency channel in which transmission of the information signal will not be substantially disrupted by intermodulation interference resulting from transmission of other information signals in the system,
   wherein frequency channels are re-assigned as additional information signals are incorporated into the system so that each information signal is transmitted without being substantially disrupted by intermodulation interference,
   wherein frequency channels are continually re-assigned to maintain a smooth tapering of transmit power levels across contiguous frequency channels, and
   wherein frequency channels are continually re-assigned such that higher-power information signals are located near a center of a frequency band and such that lower-power information signals are located near an edge of a frequency band.

17. A base station for transmitting a plurality of signals modulated on a plurality of carriers within a frequency band, comprising:
   a channel allocation processor establishing transmit power levels for the signals and allocating the signals to the carriers, in accordance with the transmit power levels, such that intermodulation products of the signals are selectively positioned in frequency, wherein each signal coinciding in frequency with a positioned intermodulation product is transmitted using a transmit power level sufficient to overcome interference from the coinciding intermodulation product.

18. A base station for transmitting a plurality of signals modulated on a plurality of carriers within a frequency band, comprising:
   a channel allocation processor establishing transmit power levels for the signals and allocating the signals to the carriers, in accordance with the transmit power levels, such that the signals are transmitted without being substantially disrupted by intermodulation interference produced in transmitting the signals,
   wherein the channel allocation processor allocates the signals to the carriers such that higher transmit power levels are allocated to carrier frequencies disposed more centrally within the frequency band and lower base station transmit power levels are allocated to carrier frequencies disposed toward edges of the frequency band.

19. A mobile switching center for use in a communications system, comprising:
   a channel allocation processor determining transmit power levels for a plurality of information signals and allocating the information signals to a plurality of frequency channels, in accordance with the determined transmit power levels, such that intermodulation products of the information signals are selectively positioned in frequency, wherein each information signal coinciding in frequency with a positioned intermodulation product is transmitted using a transmit power level sufficient to overcome interference from the coinciding intermodulation product.

20. A channel allocation processor for use in a communications system, comprising:

means for establishing transmit power levels for a plurality of information signals transmitted on a plurality of frequency channels from a transmitting station to at least one receiving station; and means for allocating the information signals to the frequency channels, in accordance with the established transmit power levels, such that intermodulation products of the information signals are selectively positioned in frequency, wherein each information signal coinciding in frequency with a positioned intermodulation product is transmitted using a transmit power level sufficient to withstand interference from the coinciding intermodulation product.

21. A method for allocating transmit frequencies in a contiguous band of transmit frequencies including at least one center transmit frequency comprising the steps of:

ordering downlink transmit powers associated with signals to be transmitted to remote stations;

allocating a first signal having a greatest downlink transmit power to said at least one center transmit frequency in said contiguous band;

allocating a second signal having a second greatest downlink transmit power to a transmit frequency which is substantially adjacent to said at least one center frequency; and continuing to allocate remaining signals in decreasing order of downlink transmit power outwardly from said at least one center frequency.

22. The method of claim 1, wherein the information signals are assigned to frequency channels such that intermodulation products resulting from transmission of the information signals coincide in frequency with information signals having transmit power levels sufficient to overcome the intermodulation products.

* * * * *

UNITED STATES PATENT AND TRADEMARK OFFICE
CERTIFICATE OF CORRECTION

PATENT NO.     : 6,061,568
DATED          : May 9, 2000
INVENTOR(S)    : Dent

It is certified that error appears in the above-identified patent and that said Letters Patent is hereby corrected as shown below:

Column 9,
Line 41, replace "8" with -- 9 --.

Signed and Sealed this

Ninth Day of July, 2002

Attest:

Attesting Officer

JAMES E. ROGAN
Director of the United States Patent and Trademark Office